Nov. 19, 1968   J. T. RUMBAUGH   3,411,232
HOOK-KEEPING SLEEVE
Filed June 30, 1966

INVENTOR.
JAMES T. RUMBAUGH
BY Meyers & Peterson
ATTORNEYS

United States Patent Office 3,411,232
Patented Nov. 19, 1968

3,411,232
HOOK-KEEPING SLEEVE
James T. Rumbaugh, Spirit Lake, Iowa, assignor to Berkley & Company, Spirit Lake, Iowa, a corporation of Iowa
Filed June 30, 1966, Ser. No. 561,937
4 Claims. (Cl. 43—25.2)

ABSTRACT OF THE DISCLOSURE

A hook-keeping sleeve for a fishing rod or fishing rod assembly, wherein the sleeve is provided with a hook keeper or retainer for receiving the bight of a fishhook in retained disposition within a hook-receiving slot formed in the keeper or retainer. It is a desirable feature that the slot have a forward and rear segment separated by a neck segment disposed therebetween, the neck segment having a cross-sectional width which is less than the cross-sectional width in either the forward or rear segments.

---

The present invention relates generally to a hook-retaining sleeve for a fishing rod or fishing rod assembly, and more particularly to an improved sleeve for a fishing rod wherein the sleeve has formed as an integral part thereof a hook-keeping or hook-retaining segment.

In the ordinary handling of fishing equipment, particularly a conventional rod and reel with line attached, and with one or more fishing hooks or fishing lures with hooks thereon attached to the line, the fishermen will frequently desire to maintain the hooks or the lures with hooks thereon in captive relationship somewhere along the length of the rod shaft in order that these hooks do not swing free, and thereby become subject to being entangled with other items, or possibly embedded in a bystander's flesh. Therefore, it becomes desirable to provide a hook keeper or retainer apparatus adjacent the handle of the rod in order to permit the user to place a hook within the confines of the hook keeper means, and thereafter be able to handle the assembly without fear of unintentionally hooking of another object or individual.

In accordance with the present invention, a hook-retaining member is molded integrally with the rod sleeve, and thereby disposed adjacent the area where the rod shaft joins the rod handle. The hook keeper substantially reduces the cost of providing such a hook keeper, and at the same time enhances the mechanical strength and other features thereof. In addition, the design of the hook-retaining portion of the sleeve is such that a slot is provided for receiving the hook shank, the slot preferably comprising first and second segments, with each segment having an axis which is generally perpendicular to the axis of the rod shaft. These segments communicate with one another, and are generally spaced apart by a pair of opposed surfaces which form a neck segment of restricted width between the individual slot segments. With this arrangement, the hook keeper provides a more definite arrangement for keeping or retaining the hook in captive relationship.

Therefore, it is an object of the present invention to provide an improved arrangement for forming a hook-retaining sleeve for a fishing rod, the hook-retaining means being integrally molded with the sleeve means along the juncture between the handle and the shaft portion of the flexible rod.

It is a further object of the present invention to provide an improved hook-retaining means which has a configuration which is particularly adapted for maintaining, retaining, or otherwise keeping a hook captive within the hook retainer per se.

Other and further objects of the present invention will become apparent to those skilled in the art upon a study of the following specification, appended claims, and accompanying drawings wherein;

Figure 1:
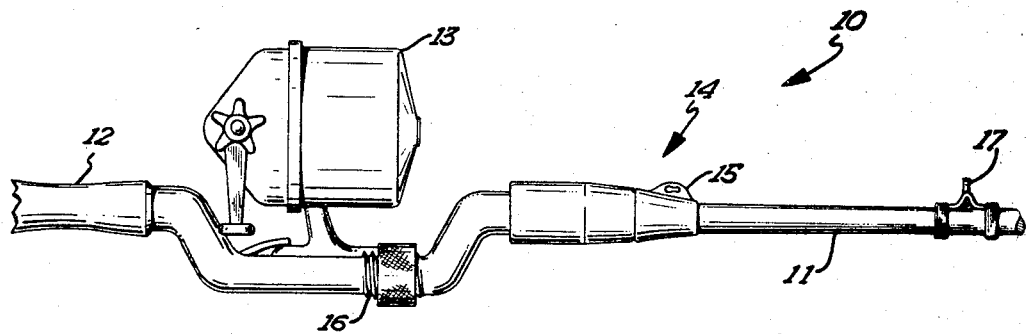
FIGURE 1 is a detail view of the handle portion of a fishing rod, the remaining portion of the shaft being broken away, the rod including a sleeve disposed between the flexible shaft and the handle means.
Figure 3:
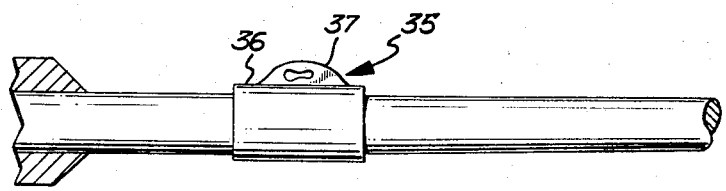
Figure 4:
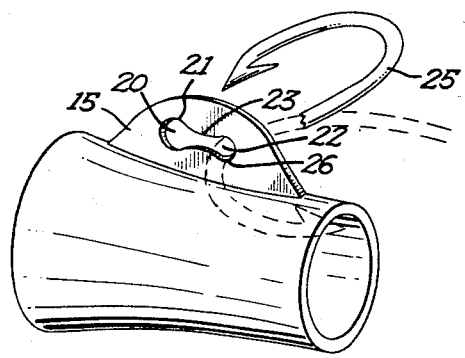

FIGURE 3 is a detail plan view showing still another modification of the sleeve means as mounted on a fishing rod shaft; and FIGURE 4 is a detail perspective view of the apparatus shown in FIGURE 1, and illustrating the manner in which a hook is disposed while being inserted into captive relationship with the hook-retaining means of the sleeve, and illustrating in dotted lines, the disposition with the hook held in the slot.

In accordance with the preferred modification of the present invention, the fishing rod assembly generally designated 10 includes a rod shaft 11 together with a handle portion 12 adapted to receive a reel 13 thereon. The handle portion 12 includes the sleeve means, generally designated 14, having an integrally molded hook keeper 15 formed thereon. As is conventional in fishing rods, the shaft member 11 is laterally flexible, and the handle portion 12 which is, of course, secured, bonded or otherwise fixed to the flexible shaft 11 has a hand gripping portion or element such as cork or the like thereon. The handle portion 12 includes a reel mounting member such as the internally threaded sleeve 16, as well. Furthermore, as is conventional, line guides or eyelets such as the guide 17 are mounted along the extent of the flexible shaft 11 and define a path for the line to move through from the reel spool to the tip end of the shaft 11.

Turning now to the sleeve means 14, this sleeve 14 including the hook keeper 15 is preferably integrally molded as a single body member. This manner of providing such a hook keeper improves the mechanical strength of the over-all assembly and substantially reduces the cost of mounting such a hook keeper onto the sleeve member. It will be appreciated, that for purposes of this application, the sleeve means 14 may also include, for example, the forward end portion of the handle 12. Turning now to the details of the structure of the hook-keeper portion of the sleeve 14, with particular reference to the details shown in FIGURE 4, the hook keeper 15 has a slot 20 formed therein, the slot 20 including first and second slot segments 21 and 22. These slot segments or areas 21 and 22 are separated by a neck segment 23 which has a pair of spaced apart abutment surfaces forming this neck segment of restricted width between the slot segments. The purpose of this neck segment is to permit easy ingress of the hook member such as the fishhook 25 into the slot 20, while at the same time maintaining the hook captive by restricting its ability to fall freely therefrom. It will further be shown that a front abutment surface 26 is normally provided to engage the bight portion of the hook such as the hook 25 when it is received in proper disposition within the slot 20.

In using this hook-keeper element, the fisherman may merely slide the tip portion of a hook such as the hook 25 through the slot 20, preferably within the large slot area 21, turn the hook with the hook shank extending toward the tip of the rod, then pull the hook member 25 forwardly in a direction toward the tip portion of the rod through the neck segment 23, and thence position the hook bight against the front abutment surface 26.

Figure 2:
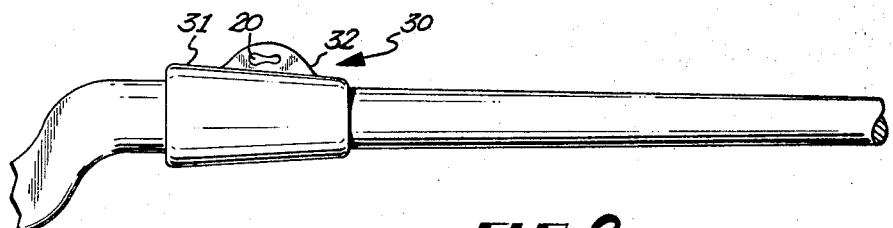
FIGURE 2 is a detail plan view similar to FIGURE 1 showing a somewhat modified form of sleeve means for receiving the flexible shaft portion and being disposed between the flexible shaft portion and the handle portion of the rod.

Particular attention is now directed to FIGURE 2 wherein a modified form of sleeve member 30 is shown, this sleeve member including a body portion 31 together with a hook-keeper portion integrally formed therewith, such as is shown at 32. The slot 20 formed therein is similar to that shown in FIGURE 4 and previously described herein.

With attention directed to FIGURE 3, the sleeve means shown generally at 35 includes a body member 36 together with a hook keeper element 37, which is, as shown, substantially similar to the hook keeper element 14 previously described herein. In its preparation, the sleeve member 35 is similar to those members previously described herein, it being illustrated in this fashion for the purpose of illustrating other similar manners of mounting hook-keeping sleeves onto fishing rods.

It will be appreciated that any suitable material may be utilized for the preparation of the sleeve means, such as, for example, nylon, epoxy, Teflon, or other suitable moldable plastic resin materials. The materials should be reasonably durable, capable of withstanding modest shock loading, and otherwise suited for use in fishing equipment generally.

What is claimed is:

1. In combination with a fishing rod having an elongated shaft with a handle end and a free end, line retaining means for mounting a supply of fishing line on said rod, guide means disposed along said shaft for establishing a guide path along said shaft from said handle end to said free end, and sleeve means disposed between said line retaining means and guide means and generally along said guide path;
   (a) hook-retaining means mounted on said sleeve means for retaining a fishhook therein, said hook-retaining means having a slot formed therein with forwardly tapering surfaces generally converging on a front abutment surface, a generally rearwardly disposed portion of said slot having a first cross-sectional width between said generally converging surfaces for receiving said hook point, and a forwardly disposed zone communicating with said rearwardly disposed zone and of a second cross-sectional width which is substantially less than said first cross-sectional width for retaining said fishhook.

2. The combination as defined in claim 1 being particularly characterized in that said hook-retaining means is integrally molded with said sleeve means, and wherein said slot has a forward segment, a rear segment, and an intermediate neck segment disposed therebetween with a cross-sectional width less than the cross-sectional width of said forward and rear segments.

3. The combination as set forth in claim 2 being particularly characterized in that said sleeve means is formed from a moldable plastic resinous substance.

4. In combination with a fishing rod having an elongated shaft with a handle end and a free end, line retaining means for mounting a supply of fishing line on said rod, guide means disposed along said shaft for establishing a guide path along said shaft from said handle end to said free end, and sleeve means disposed between said line retaining means and said guide path;
   (a) a hook-retaining means formed integrally with said sleeve means for retaining a fishhook therein, said hook-retaining means comprising a radially extending ear disposed in a plane generally parallel to the axis of said elongated shaft and having a hook-retaining slot formed therein, said hook-retaining slot comprising first and second slot segments, each slot segment having an axis generally perpendicular to the plane of said radially extending ear, said slot segments being in communication, one with another, and being separated laterally by a pair of opposed spaced apart surfaces forming a neck segment of restricted width between said slot segments, said first slot segment having a generally forwardly disposed abutment surface disposed generally perpendicularly to the axis of said elongated shaft for making contact with a fishhook retained within said slots.

References Cited

UNITED STATES PATENTS

| | | | |
|---|---|---|---|
| 2,514,645 | 7/1950 | Jardine | 43—25.2 |
| 2,527,625 | 10/1950 | Fields | 43—25.2 X |
| 3,281,981 | 11/1966 | Dykhouse | 43—25.2 |

SAMUEL KOREN, *Primary Examiner.*

D. J. LEACH, *Assistant Examiner.*